United States Patent
Ryoo

(10) Patent No.: US 8,904,215 B2
(45) Date of Patent: Dec. 2, 2014

(54) ELECTRONIC DEVICE AND POWER CONSUMPTION MEASURING METHOD THEREOF

(75) Inventor: Jaekwan Ryoo, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 885 days.

(21) Appl. No.: 13/085,974

(22) Filed: Apr. 13, 2011

(65) Prior Publication Data

US 2011/0258470 A1    Oct. 20, 2011

(30) Foreign Application Priority Data

Apr. 14, 2010 (KR) ................ 10-2010-0034294

(51) Int. Cl.
 *G06F 1/26* (2006.01)
 *G06F 1/32* (2006.01)

(52) U.S. Cl.
 CPC .......... *G06F 1/3203* (2013.01); *Y02B 60/1282* (2013.01); *G06F 1/26* (2013.01); *Y02B 60/32* (2013.01); *G06F 1/3287* (2013.01)
 USPC .............. 713/323; 713/300; 713/320; 700/2; 700/22; 714/14; 714/22

(58) Field of Classification Search
 CPC ............. G06F 1/3203; G06F 11/3006; G06F 11/3058; G06F 11/4466
 USPC ........... 713/300, 320, 323; 700/2, 22; 714/14, 714/22
 See application file for complete search history.

(56) References Cited

U.S. PATENT DOCUMENTS 7,062,663 B2    6/2006 Meynard
7,243,243 B2    7/2007 Gedeon
8,578,193 B2 *  11/2013 Kim et al. ............... 713/322

FOREIGN PATENT DOCUMENTS

JP    2006-294021    10/2006
KR    10-2005-0002667 A    1/2005

* cited by examiner

*Primary Examiner* — Michael J Brown
(74) *Attorney, Agent, or Firm* — Lee & Morse, P.C.

(57) ABSTRACT

An embodiment is directed to an electronic device, including a power management device, the power management device generating a plurality of powers according to power management information, and a processor, the processor including a plurality of power blocks supplied with the plurality of powers through a plurality of power lines, and including a power consumption measurement block that measures power consumption of respective power blocks of the plurality of power blocks.

20 Claims, 7 Drawing Sheets

ELECTRONIC DEVICE AND POWER CONSUMPTION MEASURING METHOD THEREOF

BACKGROUND

1. Field

Embodiments relate to an electronic device and a power consumption measuring method thereof.

2. Description of the Related Art

As electronics become more sophisticated and highly integrated, it becomes more difficult to use traditional techniques for evaluation of internal parameters. For example, measuring power consumption of internal elements may become more difficult.

SUMMARY

An embodiment is directed to an electronic device, including a power management device, the power management device generating a plurality of powers according to power management information, and a processor, the processor including a plurality of power blocks supplied with the plurality of powers through a plurality of power lines, and including a power consumption measurement block that measures power consumption of respective power blocks of the plurality of power blocks.

The power management information may be provided from the processor to the power management device.

The plurality of power lines may be directly connected between the power management device and the processor.

The power management device may supply power to the power consumption measurement block upon power consumption measurement.

The processor may further include a power measurement active block configured to determine whether power is supplied to the power consumption measurement block.

The power measurement active block may include a first hardware pin supplied with a driving voltage or a ground voltage, and a second hardware pin supplied with a driving voltage or a ground voltage. The voltages supplied to the first and second hardware pins may determine whether power is supplied to the power consumption measurement block.

The power consumption measurement block may measure the power consumption of the respective power blocks in concurrence with power supply, and store measured power consumption information.

The processor may further include a communication block receiving test data from the outside for power consumption measurement, and outputting the stored power consumption information of the power consumption measurement block to the outside, and the test data includes power management modes of the processor, information indicating a target power block to be measured, and a voltage level of the target power block.

The processor may read a boot code upon power-up, and perform a boot up according to the read boot code.

The electronic device may further include a boot memory storing the boot code, and a main memory storing programs. The programs may include a processing program for processing stored power consumption information, and the processor may process the stored power consumption information according to the processing program, and then output the processed power consumption information.

The power consumption measurement block may calculate power values of each of the power blocks.

The power consumption measurement block may store electric current pattern information of each of power blocks, the electric current pattern information corresponding to power values of each of the power blocks.

The power consumption measurement block may measure and store the power consumption of each of the power blocks when the processor enters a sleep mode, and the processor may output the stored power consumption information to the outside upon wake-up of the processor.

Another embodiment is directed to a method of measuring power consumption of an electronic device that includes a power management device generating a plurality of powers according to power management information, and including a processor having a plurality of power blocks supplied with the plurality of powers through a plurality of power lines and having a power consumption measurement block measuring power consumption of each of the plurality of power blocks, the method including receiving test data from the outside, setting the power management device according to the received test data, measuring power consumption according to the received test data, storing the measured power consumption information, and outputting the stored power consumption information to the outside.

The test data may include power management modes of the processor, information indicating at least one target power block to be measured, and a voltage level corresponding to the at least one target power block.

The processor may enter a sleep mode, and then output the stored power consumption information to the outside after the processor is woken up.

Another embodiment is directed to an electronic device, including a boot memory storing a boot code, a main memory storing a processing program, a power management device supplied with power through a battery and generating a plurality of powers according to power management information, and a processor having a plurality of power blocks supplied with a plurality of powers from the power management device, and having a power consumption measurement block measuring and storing power consumption of each of the plurality of power blocks, the processor performing a boot up according to the boot code of the boot memory, and processing the stored power consumption information according to the processing program of the main memory.

The processor may include a Central Processing Unit (CPU) core, a power management device controller controlling the power management device, an interrupt controller controlling an interrupt of the CPU core, a communication block performing a communication with the outside, and a power measurement active block for determining whether power is supplied to the power consumption measurement block.

The power consumption measurement block may include an electric current sensor sensing an electric current flowing in each of a plurality of power lines for measurement of the power consumption, an analog-digital converter converting the measured power value into a digital value, and a measurement information register storing measured power consumption information.

Another embodiment is directed to an electronic device, including a processor unit, the processor unit including a processor and having at least two power blocks, a power supply unit, the power supply unit providing power to the at least two power blocks, and electric current sensors respectively corresponding to the at least two power blocks, each electric current sensor monitoring power consumption of a power block. The processor may be placed into at least two operation modes, the operation modes including a first operation mode that is a sleep mode and second operation mode that is a normal mode, and processor may be configured to output information regarding the power consumption that is monitored by the electric current sensors in response to a command, the information including information regarding power consumption in the first operation mode and information regarding power consumption in the second operation mode.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
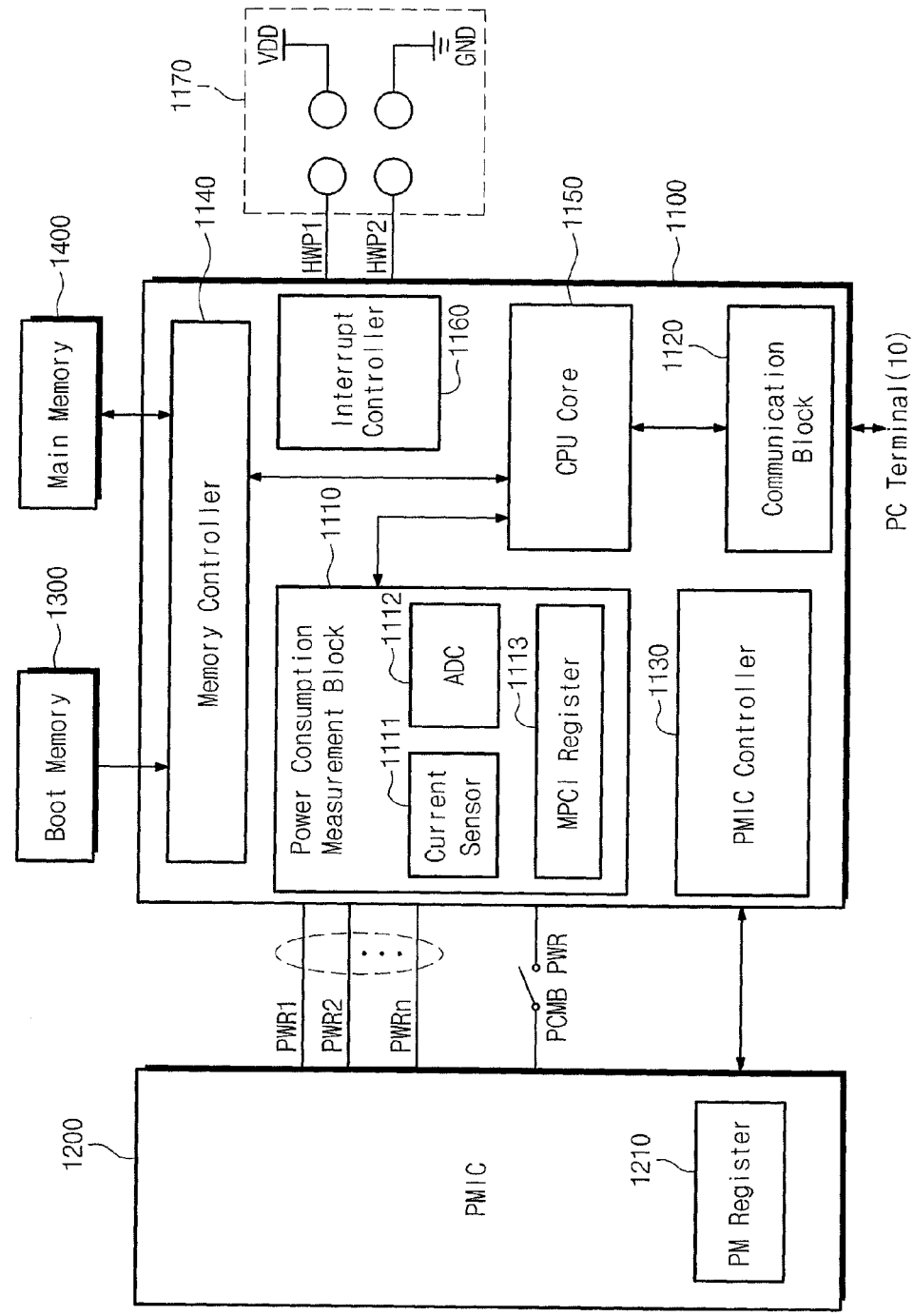
FIG. 1 illustrates a diagram of an electronic device according to a first example embodiment.

Korean Patent Application No. 10-2010-0034294, filed on Apr. 14, 2010, in the Korean Intellectual Property Office, and entitled: "Integrated Circuit and Power Consumption Measuring Method Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. In the drawing figures, the dimensions of layers and regions may be exaggerated for clarity of illustration. Like reference numerals refer to like elements throughout.

FIG. 1 illustrates a diagram of an electronic device according to a first example embodiment.

Referring to FIG. 1, an electronic device 1000 may include a processor 1100, a power management integrated circuit (PMIC) 1200, a boot memory 1300, and a main memory 1400.

The processor 1100 may control overall operations of the electronic device 1000. The processor 1100 may include a plurality of power blocks receiving a plurality of powers (e.g., 1.0 V, 1.2 V, 1.8 V, 3.3 V, etc.) from the PMIC 1200 through a plurality of power lines PWR0 to PWRn, where n is a natural number. For example, the plurality of power blocks may include a communication block 1120, a PMIC controller 1130, a memory controller 1140, a central processing unit (CPU) core 1150, and an interrupt controller 1160.

The plurality of power lines PWR0 to PWRn may be directly connected between the processor 1100 and the PMIC 1200. Power supplied through the power lines PWR0 to PWRn may be used to drive the plurality of power blocks in the processor 1100. Respective power blocks may make up a set that is supplied with the same power.

A power line PCMB PWR may directly connect a power consumption measurement block 1110 of the processor 1100 to the PMIC 1200 using a power measurement active block 1170, such that the power supply of the power consumption measurement block 1110 may be determined by the power measurement active block 1170. For example, when power consumption is measured, power may be supplied to the power consumption measurement block 1110 and, when the power consumption is not measured, power may not be supplied to the power consumption measurement block 1110.

The processor 1100 may receive a boot code from the boot memory 1300 upon power-up of the electronic device 1000, and perform a bootstrap using the received boot code. The processor 1100 may process data that is read from the main memory 1400, or may store processed data in the main memory 1400. The electronic device 1000 may be used in, e.g., a mobile communication terminal, and the processor 1100 may execute application programs for providing necessary information to a user and an operating system of the mobile communication terminal, and may perform multimedia data processing and data operations, etc.

As shown in FIG. 1, the processor 1100 may include the power consumption measurement block 1110, the communication block 1120, the memory controller 1140, the CPU core 1150, the interrupt controller 1160, and a power measurement active block 1170. The processor 1100 may include the power consumption measurement block 1110 that measures power consumption of blocks in the processor 1100 by itself, i.e., without requiring a separate measuring instrument.

The power consumption measurement block 1110 may measure respective power consumptions of the respective power blocks, e.g., by detecting electric currents flowing through the power lines PWR1 to PWRn. The power consumption measurement block 1110 may include an electric current sensor 1111 detecting electric current flowing in the respective power lines PWR1 to PWRn, an analog-digital converter 1112 converting detected analog electric current values into digital values, and a measurement information register 1113 storing measured power consumption information. The measured power consumption information may be power consumption values of the power blocks.

In an implementation, the measured power consumption information may be processed according to programs stored in the main memory 1400 and then outputted to the outside (e.g., using a PC terminal 10, as shown in FIG. 1). For example, the measured power consumption information may be processed according to the programs of the main memory 1400 so that a user may know the measured power consumption information more conveniently.

The power consumption measurement block 1110 may receive power from the PMIC 1200 and start power consumption measurement. In another implementation, the power consumption measurement block 1110 may not start the power consumption measurement according to the power supply of the PMIC 1200, but instead may start the power consumption measurement in response to a measurement command inputted from the outside (e.g., using PC terminal 10).

In FIG. 1, one electric current sensor 1111 is shown. However, embodiments are not limited thereto, and the power consumption measurement block 1110 may include a plurality of electric current sensors, e.g., for detecting electric current flowing in the respective power lines PWR1 to PWRn. Also, one measurement information register 1113 is shown in FIG. 1, but embodiments are not limited thereto and the power consumption measurement block 1110 may include more than one measurement information register.

In an implementation, the measured power consumption information may include power consumption values of the respective power blocks, and may include electric current pattern information corresponding to the power consumption values. The electric current pattern information may approximately correspond to certain power consumption values. For example, the degree of power consumption may be predicted from the shape of electric current pattern.

In an embodiment, the power consumption values stored in the measurement information register 1113 may be calculated from measurement of consumed electric current and the output voltage.

In an embodiment, the electric current pattern information stored in the measurement information register 1113 may be a count value from a specific first level to a specific second level, i.e., the measurement information register 1113 may store the count of an electric current pattern.

When the electric current pattern information is outputted to the outside, the power consumption value corresponding to the electric current pattern information may be outputted to the outside by the processor 1100. To this end, the processor 1100 may perform a matching operation according to a program that transforms tabulated information or electric current pattern information regarding the power consumption value corresponding to the electric current pattern into power consumption values, and may output the resulting values, i.e., output the power consumption values, to the outside. The program (for transforming the table information or the electric current pattern information regarding the power consumption value corresponding to the electric current pattern) may be stored in the main memory 1400.

In an implementation, the power consumption information stored in the measurement information register 1113 may be outputted to the external PC terminal 10 through the communication block 1120.

Although not shown, the power consumption measurement block 1110 may include a resistor, a differential operator, a data standardization function block configured with a high-resolution analog-digital converter, and a logic block calculating the output voltage and the power consumption.

The communication block 1120 may be an apparatus for performing communication between the processor 1100 and the outside, and may include a Universal Asynchronous Receiver/Transmitter (UART). In an embodiment, the communication block 1120 may be set in an inactive state in a sleep mode, and may be set in an active state in a normal mode.

The communication block 1120 may receive test data from the outside (e.g., using PC terminal 10) for power consumption measurement. The test data may include information for power consumption measurement. For example, the test data may include a power management mode of the processor 1100, information indicating a target power block (the power consumption of which is to be measured), and a level of a voltage supplied to the target power block. The communication block 1120 may output the power consumption information read from the MPCI register 1113 to the outside.

The PMIC controller 1130 may control the PMIC 1200 according to the power management mode, which include the normal mode and the sleep mode mentioned above. In the sleep mode, power consumption may be reduced by stopping power and a clock that are supplied to the CPU core 1150 and most internal logics. When a wake-up command is generated in the sleep mode, the power management mode may return to the normal mode. Information about the power management mode may be stored in the power management register 1210 of the PMIC 1200.

The memory controller 1140 may control the boot memory 1300 and the main memory 1400. The memory controller 1140 may include a first memory controller (not shown) controlling the boot memory 1300 and a second memory controller (not shown) controlling the main memory 1400.

The CPU core 1150 may control overall operations of the processor 1100. In an embodiment, the CPU core 1150 may be an ARM core.

The interrupt controller 1160 may control interrupt of peripheral Input/Output (I/O).

The power measurement active block 1170 may determine activation of the power consumption measurement block 1110 according to voltages supplied to a first hardware pin HWP1 and a second hardware pin HWP2 (the number of hardware pins is not limited to two). In an implementation, the power measurement active block 1170 may determine whether power is supplied to the power consumption measurement block 1110 according to setting of the hardware pins HWP1 and HWP2.

In an implementation, the setting of the hardware pins HWP1 and HWP2 may be determined by logic high (e.g., driving voltage) or logic low (e.g., ground voltage). For example, when the first hardware pin HWP1 is supplied with a driving voltage VDD, and the second hardware pin HWP2 is supplied with a ground voltage GND, the interrupt controller 1150 may generate a corresponding interrupt signal. The power line PCMB PWR may be electrically connected between the PMIC 1200 and the power consumption measurement block 1110 in response to the generated interrupt signal. Thus, power may be supplied to the power consumption measurement block 1110 through the connected power line PCMB PWR.

As another example, when the ground voltage GND is supplied to the first and second hardware pins HWP1 and HWP2, the interrupt controller 1150 may generate a corresponding interrupt signal, and may disconnect the power line PCMB PWR between the PMIC 1200 and the power consumption measurement block 1110 in response to the generated interrupt signal. Thus, the power measurement active block 1170 may prevent unnecessary power supply to the power consumption measurement block 1110 during a general operation in which power consumption is not measured.

In an embodiment, the power measurement active block 1170 may use a General Purpose Input Output (GPIO).

The PMIC 1200 may be supplied with power from the outside (e.g., from a battery). The PMIC 1200 may generate a plurality of powers (e.g., 1.0 V, 1.2 V, 1.8 V, 3.3 V, etc.) in response to clock information and data that are inputted from the PMIC controller 1130. The PMIC 1200 may supply the generated powers to the processor 1110 through the power lines PWR1 to PWRn. The PMIC 1200 may include a power management register 1210 storing the power management information. The power management information may be supplied to the PMIC controller 1130. For example, the power management information may include clock information and data, which are inputted from the PMIC controller 1130.

The PMIC 1200 may receive power management information corresponding to test data inputted from the outside (e.g., using PC terminal 10) upon measurement of power consumption from the PMIC controller 1130. The test data may include, e.g., a power management mode (e.g., normal mode and sleep mode) of the processor 1100, information indicating target power blocks to be measured, and a level of a voltage supplied to the target power blocks.

The boot memory 1300 may store a boot code for boot up of the processor. The boot memory 1300 may be a non-volatile memory. The boot memory 1300 may be configured using, e.g., NAND flash memories, NOR flash memories, Resistive Random Access Memories (RRAMs), Phase-change Memories (PRAMs), Magnetoresistive Random Access Memories (MRAMs), Ferroelectric Random Access Memories (FRAMs), Spin Transfer Torque Random Access Memories (STT-RAMs), etc.

The main memory 1400 may store programs necessary for operation of the processor 1100, and may store data generated during the processing operation of the processor 1100. The programs may include, e.g., processing programs used for processing measured power consumption information upon measurement of power consumption. Thus, the power consumption information stored in the MPCI register 1113 may be processed according to the processing programs stored in the main memory 1400.

In FIG. 1, the boot memory 1300 and the main memory 1400 are shown as being separated from each other. However, embodiments are not limited thereto. For example, an electronic device according to an embodiment may use one memory for storing boot codes and user data. Examples of such a memory may include PRAMs or NOR flash memories.

The electronic device 1000 according to the present embodiment may deliver measured power consumption information to a user by measuring power consumption of each of power blocks (without a separate measuring instrument), and storing and processing the measured information.

The electronic device 1000 according to the present embodiment may significantly reduce development costs and development time by automatically measuring, storing, and processing power consumption, without the need for expensive, high-capacity, and large-weight measurement equipment and the attendant jumper units typically needed when measuring power consumption.

The electronic device 1000 according to the present embodiment may arbitrarily select a desired power operation mode and block to be measured upon measurement of power consumption of the processor 1100, e.g., by controlling the power consumption measurement block 1110 according to test data inputted through the communication block 1120. In an implementation, the electronic device 1000 may measure power consumption of the processor 1110 in sleep mode.

Figure 2:
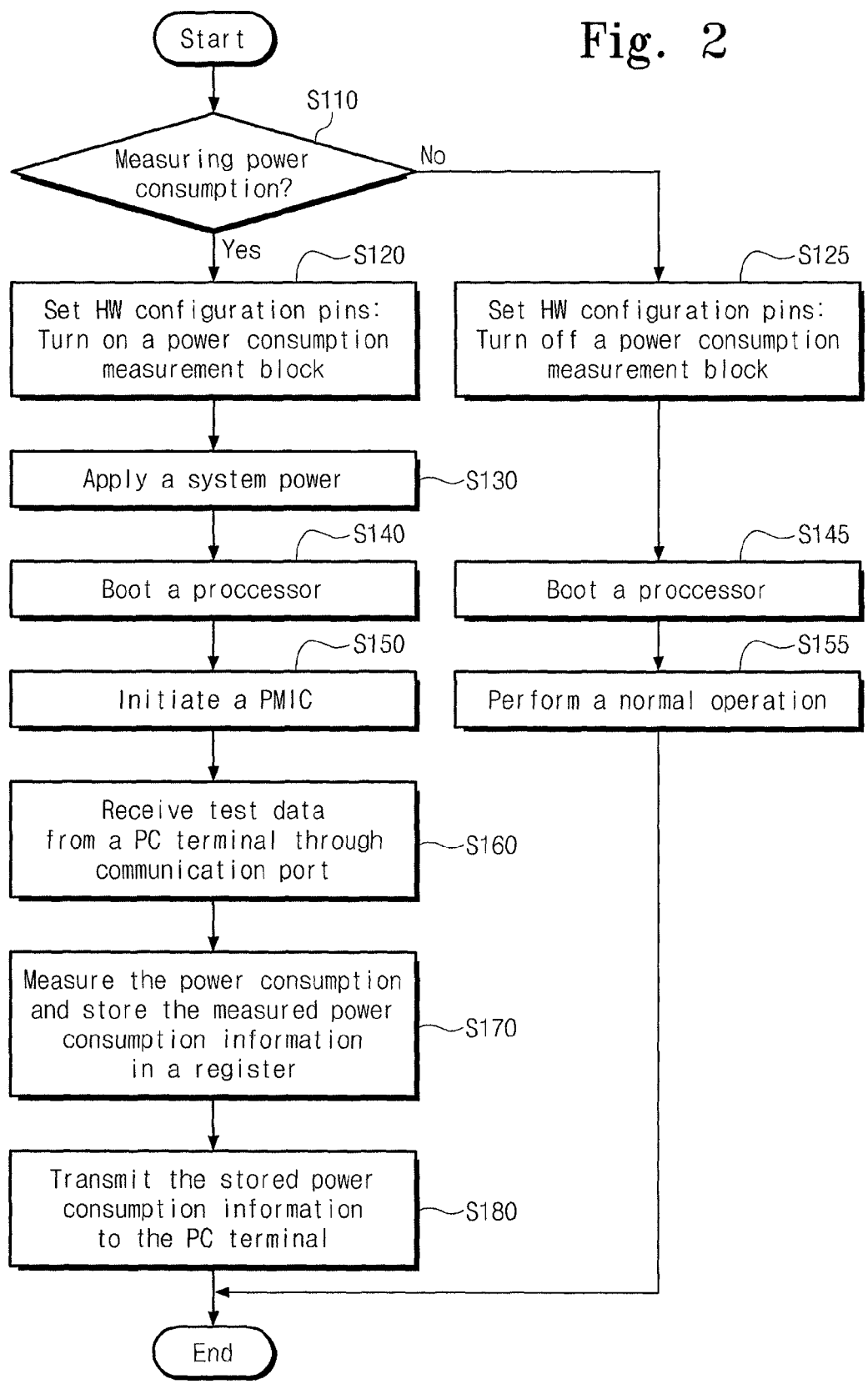
FIG. 2 illustrates a flowchart of a method of measuring power consumption of the electronic device of FIG. 1.

FIG. 2 illustrates a flowchart of a method of measuring power consumption of the electronic device 1000 of FIG. 1. Referring to FIGS. 1 and 2, an example power consumption measurement method for the electronic device 1000 will now be described.

In operation S110 of FIG. 2, a manufacturer or a user of the electronic device 1000 may determine whether power consumption is to be measured for the electronic device 1000.

If the manufacturer or the user of the electronic device 1000 intends to measure the power consumption, in operation S120, hardware pins HWP1 and HWP2 may be set to supply power to the power consumption measurement block 1110. For example, a driving voltage VDD may be supplied to the first hardware pin HWP1, and a ground voltage GND may be supplied to the second hardware pin HWP2. In this case, the interrupt controller 1160 may generate interrupt signals (or active signals) according to the first and second hardware pins HWP1 and HWP2 that have been set. The PMIC 1200 and the power consumption measurement block 1110 may be electrically connected to each other by the generated interrupt signals (as described above, power may be supplied from the PMIC 1200 to the power consumption measurement block 1110 through the connected power line PCMB PWR).

In operation S130, system power may be applied from the PMIC 1200 to the processor 1100 through the plurality of power lines PWR1 to PWRn.

Thereafter, when the system power reaches a certain level (e.g., a power on reset voltage), the electronic device 1000 may be booted in operation S140. The processor 1100 may read a boot code from the boot memory 1300, and perform a bootstrap boot up using the boot code that is read from the boot memory 1300.

In operation S150, the PMIC 1200 may be initialized. The initialization of the PMIC 1200 may be performed by the PMIC controller 1130. For example, the PMIC controller 1130 may output clock information and data on operation clock signals to the PMIC 1200. The operation clock signals may be signals that have variable frequencies, the clock signals being supplied for operation of the CPU core 1150.

In an implementation, the CPU core 1150 may be synchronized with the operation clock signals to perform command transmission and data write or read operation. The clock information outputted to the PMIC 1200 may be actual operation clock signals, or may be information signals having frequency or period values of the operation clock signals.

The PMIC 1200 may receive power from the outside (e.g., from a battery), may generate a plurality of powers in response to the clock information and data inputted from the PMIC controller 1130, and may then provide the generated powers to the processor 1110 through the power lines PWR1 to PWRn. The PMIC 1200 may include a power management register 1210 storing the above-described power management information. The power management information may be supplied from the PMIC controller 1130.

In operation S160, the processor 1100 may receive information about a power management mode for measurement of power consumption, a target power block to be measured, and test data having a voltage level corresponding to the target power block. Such information may be provided using the Personal Computer terminal 10 through communication ports. The test data may be, e.g., sleep mode test data informing that the power management mode is a sleep mode.

A user may select various test data for measurement of power consumption of the processor 1100 using the PC terminal 10. Thus, the user may measure the power consumption on the processor 1100 according to the power mode or power block.

The PMIC controller 1120 may generate power management information according to the inputted test data, and transmit the generated power management information to the PMIC 1200. The PMIC 1200 may generate powers according to the transmitted power management information and supply the generated powers to the processor 1100.

In operation S170, the power consumption measurement block 1110 may measure power consumption on the target power block upon receiving a power supply from the PMIC 1200. The power consumption measurement block 1110 may store the measured power consumption information in the register 1113. The measured power consumption information may include electric current pattern information, power values for power consumed in the target power blocks, etc. The measured power values may be values that have been changed into digital values, and the electric current pattern information may be information corresponding to certain power values.

In operation S180, the processor 1100 may read the stored power consumption information from the measurement information register 1113, and transmit the read power consumption information to the PC terminal 10 through the communication block 1150. The measurement of the power consumption of the electronic device 1000 may thus be completed.

In another implementation, when a user does not desire the measurement of the power consumption, the hardware pins HWP1 and HWP2 may be set to not supply power to the power consumption measurement block 1110 in operation S125. For example, a ground voltage GND may be supplied to the first and second hardware pins HWP1 and HWP2. Here, the interrupt controller 1160 may generate interrupt signals (or inactive signals) according to the settings of the first and second hardware pins HWP1 and HWP2. The PMIC 1200 may be disconnected from the power consumption measurement block 1110 by the generated interrupt signals (via disconnection of the power line PCMB PWR between the PMIC 1200 and the power consumption measurement block 1110).

Thereafter, system power may be applied from the PMIC 1200 to the processor 1100 through the plurality of power lines PWR1 to PWRn. When the system power reaches a certain level (e.g., power on reset voltage), the electronic device 1000 may be booted in operation S145. In operation S155, the processor 1100 may operated in a normal mode by a program stored in the main memory 1400.

As described above, the electronic device 1000 according to the embodiment may measure power consumption on the respective power blocks of the processor 1100 by itself.

Upon entry of the processor 1100 to the sleep mode, the communication block 1120 shown in FIG. 1 may be in an inactive state. Therefore, in an implementation the measured power consumption information may not be outputted to the outside upon entry of the sleep mode. Rather, when the processor 1100 is later woken up and the communication block 1120 is activated, the measured power consumption information may be then outputted to the outside through the communication block 1120.

The processor 1100 may receive test data from the outside to output the measured power consumption information, and transmit the power consumption information stored in the MPCI register 1113 to the outside through the communication block 1120 in response to the received test data.

Figure 3:
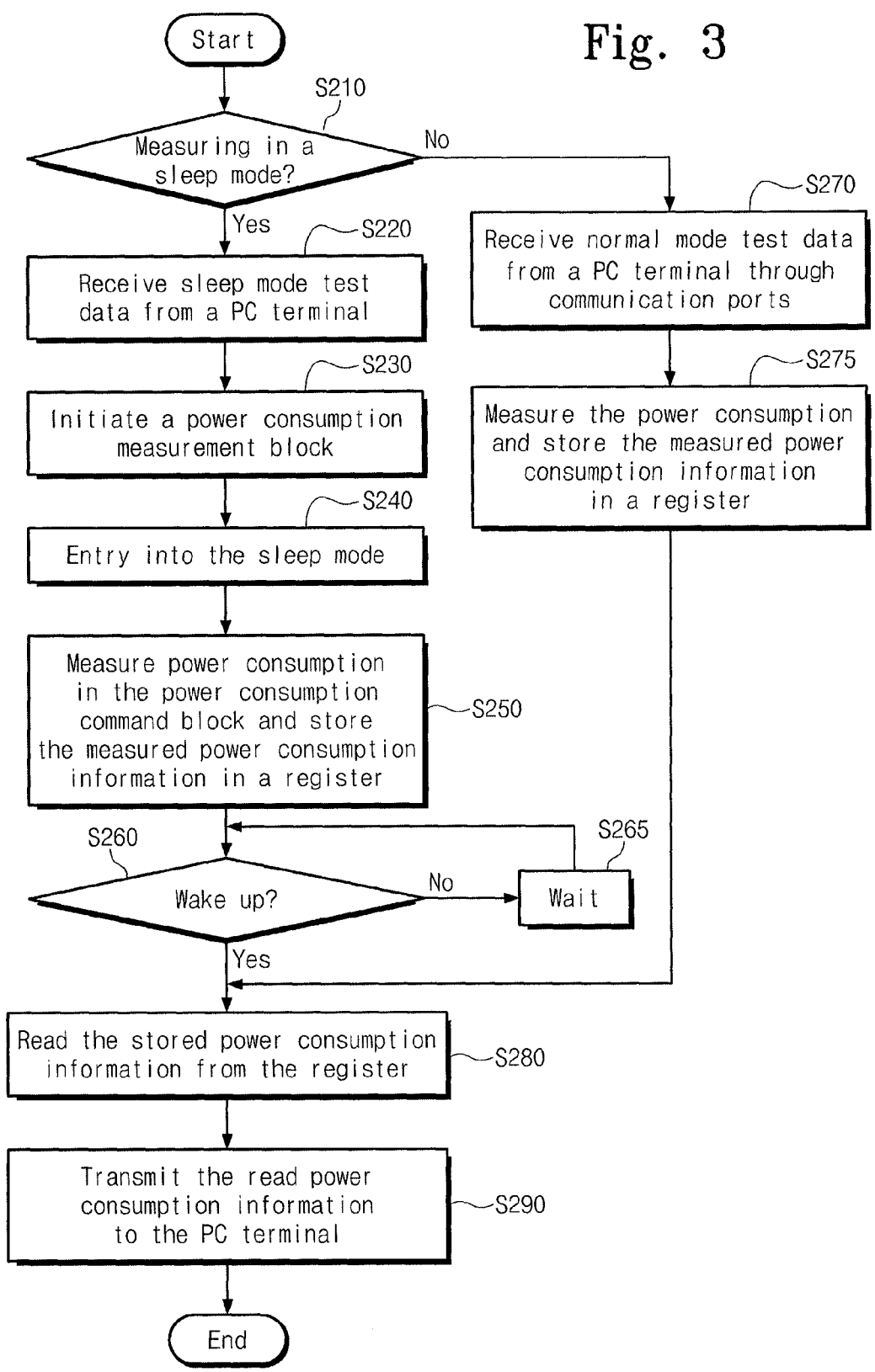
FIG. 3 illustrates a flowchart of a method of measuring power consumption of the electronic device of FIG. 1 upon entrance to sleep mode.

FIG. 3 illustrates a flowchart of a method of measuring power consumption of the electronic device 1000 of FIG. 1 upon entering sleep mode. Referring to FIGS. 1 and 3, an example power consumption measurement method for the electronic device 1000 upon entry to the sleep mode will now be described.

In operation S210 of FIG. 3, a manufacturer or a user of the electronic device 1000 may determine whether power consumption on the processor 1100 is to be measured in the sleep mode.

If the manufacturer or user intends to measure the power consumption of the processor 1100 in the sleep mode, test data may be received from the PC terminal 10 in operation S220. Here, the test data may include a command for entering the processor 1100 into the sleep mode.

Thereafter, the PMIC 1200 may be set according to the test data, and the power consumption measurement block 1110 may be initialized by receiving power from the PMIC 1200 in operation S230.

In operation S240, the processor 1100 may enter the sleep mode according to the inputted test data. Upon entry to the sleep mode, the power supply to most power blocks may be interrupted, i.e., except for the power consumption measurement block 1110, the PMIC 1200 may not supply power to most power blocks.

In operation S250, the power consumption measurement block 1110 may measure power consumption on a target power block according to the test data, and store the measure power consumption information in the MPCI register 1113. Thus, the MPCI register 1113 may store power values or pattern information that are measured in the sleep mode.

In operation S260, it is determined whether the processor 1100 is woken up. If the processor 1100 is not woken up, the procedure waits until the processor 1100 is woken up in operation S265 (although FIG. 3 shows operation S265 returning to directly before operation S260, operation S265 may return to another point in the process). On the other hand, if the processor is woken up, the procedure proceeds to operation S280.

In operation S280, the processor 1100 may read the measured power consumption information from the MPCI register 1113 upon sleep mode.

Returning to operation S210, if the power consumption of the processor 1100 is not to be measured in the sleep mode (operation S210), then normal mode test data may be received (e.g., from the PC terminal 10 through the communication ports) in operation S270.

In operation S275, the power consumption measurement block 1110 may measure power consumption according to the inputted test data, and store the measured power consumption information in the MPCI register 1113. Thereafter, in operation S280, the processor 1100 may read the measured power consumption information from the MPCI register 1113.

In operation S290, the processor 1100 may transmit the power consumption information (read from the MPCI register 1113) to the PC terminal 10 through the communication block 1120.

As described above, the power consumption measurement method of the electronic device 1000 according to the embodiment may measure power consumption on the respective power blocks, even where the processor 1100 is placed into a sleep mode.

Figure 4:
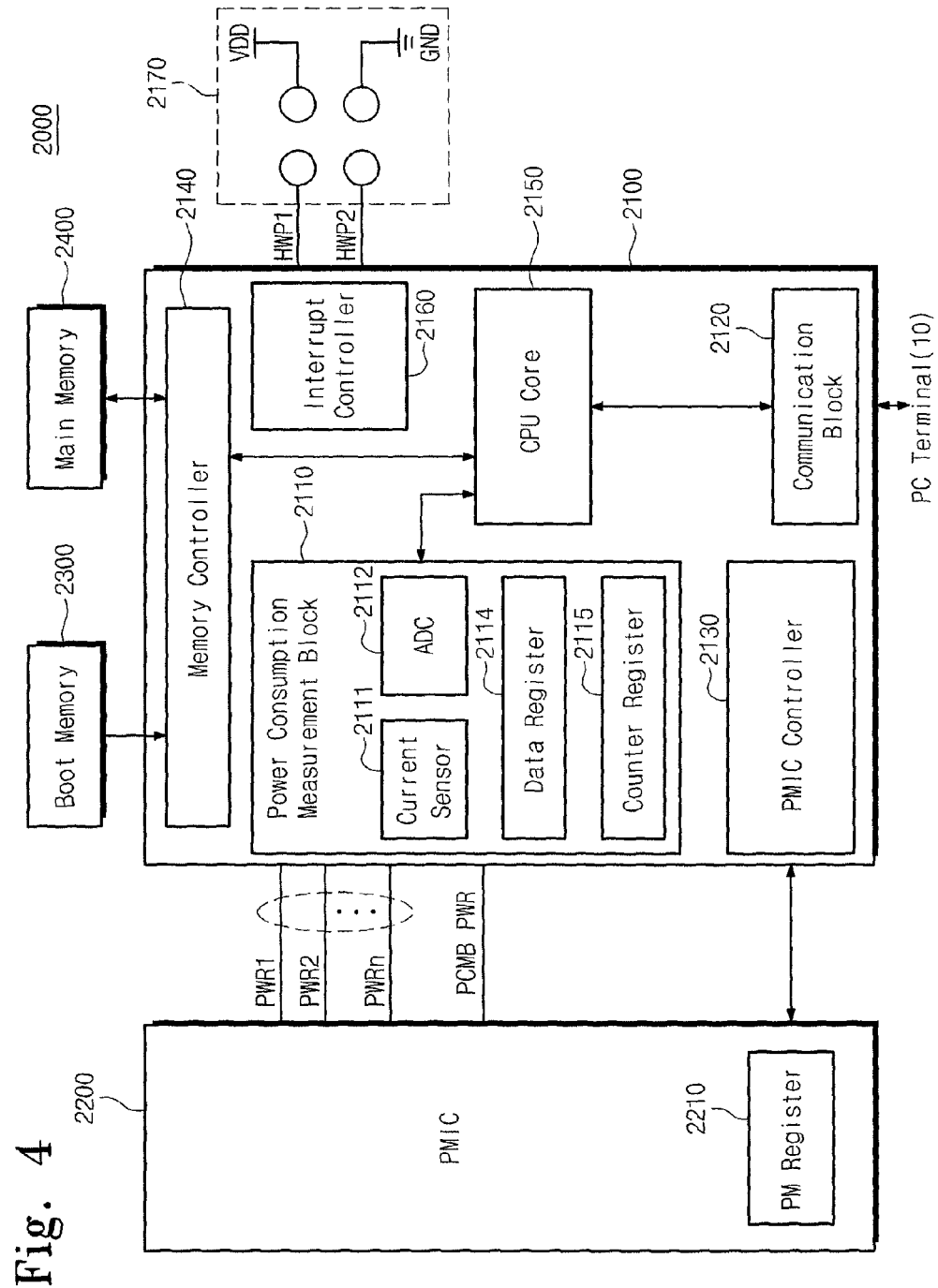
FIG. 4 illustrates a diagram of an electronic device according to a second example embodiment.

FIG. 4 illustrates a diagram of an electronic device according to a second example embodiment. A register storing data corresponding to power values and a register separately storing count values corresponding to electric current pattern may be separately provided.

Referring to FIG. 4, an electronic device 2000 may include a processor 2100, a PMIC 2200, a boot memory 2300, and a main memory 2400. The PMIC 2200, the boot memory 2300, and the main memory 2400 may have the same configuration and functions as those of the PMIC 1200, the boot memory 1300, and the main memory 1400 shown in FIG. 1, respectively.

The processor 2100 may be implemented similarly to the processor 1100 of FIG. 1, except as will now be described for the power consumption measurement block 2110. The power consumption measurement block 2110 may include a data register 2114 storing measured power values and a counter register 2115 storing count values corresponding to electric current pattern information. The electronic device 2000 according to the embodiment may measure and store power values and pattern information with respect to each power block of the processor 2100 by using the data register 2114 for storing the measured power values and using the counter register 2115 for storing the count values corresponding to the electric current pattern information In FIGS. 1 through 4, the power consumption measurement blocks are provided in the processor. However, embodiments are not limited thereto. For example, the power consumption measurement blocks may be provided in the PMIC, as will now be described.

Figure 5:
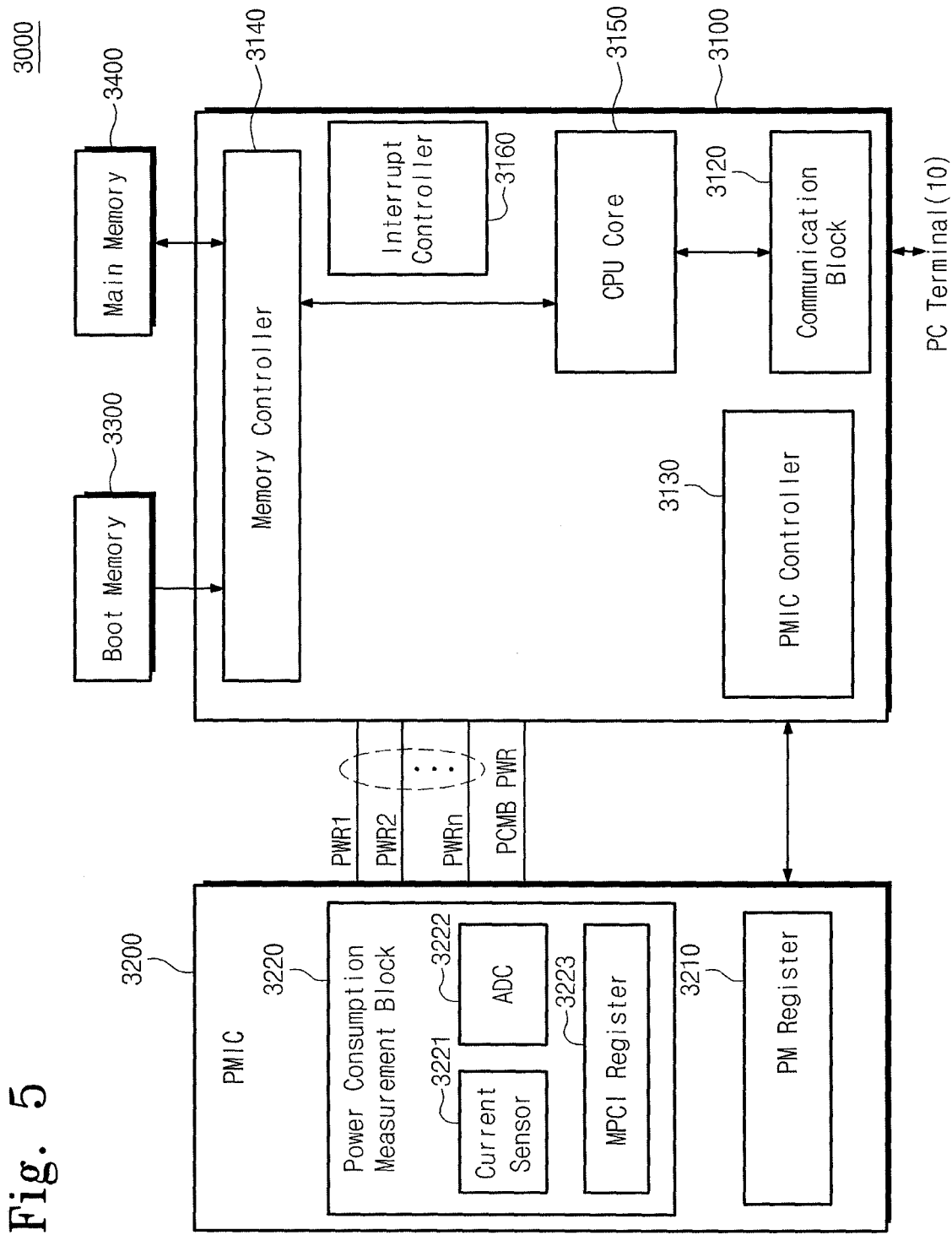
FIG. 5 illustrates a diagram of an electronic device according to a third example embodiment.

FIG. 5 illustrates a diagram of an electronic device according to a third example embodiment.

Referring to FIG. 5, an electronic device 3000 may include a processor 3100, a PMIC 3200, a boot memory 3300, and a main memory 3400. The boot memory 3300 and the main memory 3400 may have the same configuration and functions as those of the boot memory 1300 and the main memory 1400 shown in FIG. 1, respectively.

The processor 3100 may be implemented similarly to the processor 1100 of FIG. 1, except as will now be described for the power consumption measurement block 3220. In particular, the PMIC 3200 may include a Power Management (PM) register 3210 for storing power management information and a power consumption measurement block 3220 for measuring power consumption. The power consumption measurement block 3220 may have the same configuration and functions as those of the power consumption measurement block 1110 shown in FIG. 1. However, the electronic device 3000 according to the present embodiment may facilitate integration of the processor 3100 by disposing the power consumption measurement block 3220 at the outside of the processor 3100.

In FIG. 5, the power consumption measurement block 3220 is provided in the PMIC 3200. However, embodiments are not limited thereto. For example, the power consumption measurement block 3220 may be provided at the outside of the processor 3100 and the PMIC 3200, as will now be described.

Figure 6:
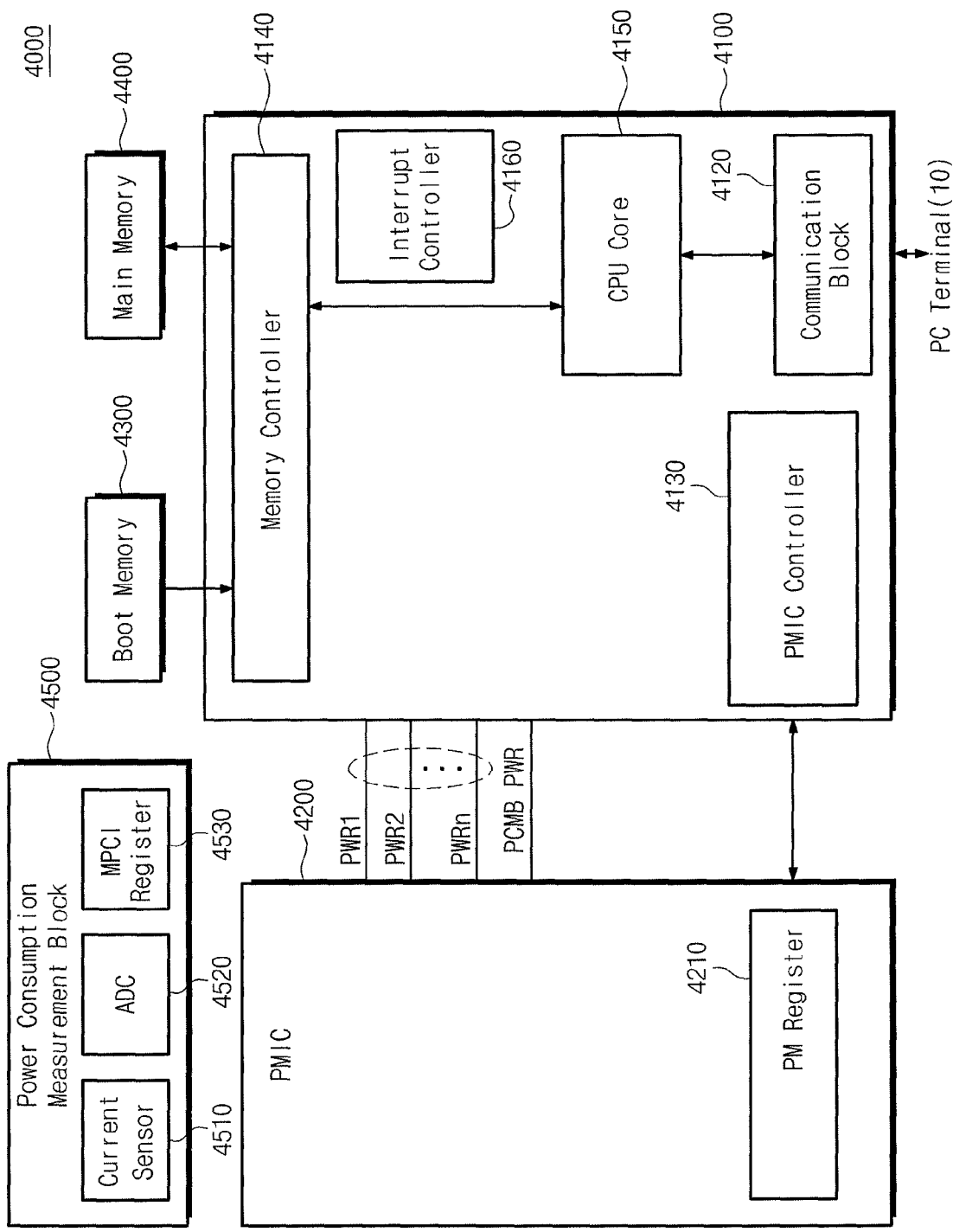
FIG. 6 illustrates a diagram of an electronic device according to a fourth example embodiment.

FIG. 6 illustrates a diagram of an electronic device according to a fourth example embodiment.

Referring to FIG. 6, an electronic device 4000 may include a processor 4100, a PMIC 4200, a boot memory 4300, a main memory 4400, and a power consumption measurement block 4500. The PMIC 4200, the boot memory 4300, and the main memory 4400 may have the same respective configurations and functions as those of the PMIC 1200, the boot memory 1300 and the main memory 1400 shown in FIG. 1.

The processor 4100 may be implemented similarly to the processor 1100 of FIG. 1, except as will now be described for the power consumption measurement block 4500. In particular, the power consumption measurement block 4500 may have the same configuration and function as those of the power consumption measurement block 1110 shown in FIG. 1. The electronic device 4000 according to the present embodiment may facilitate integration of the processor 4100 by disposing the power consumption measurement block 4220 at the outside of the processor 4100.

Figure 7:
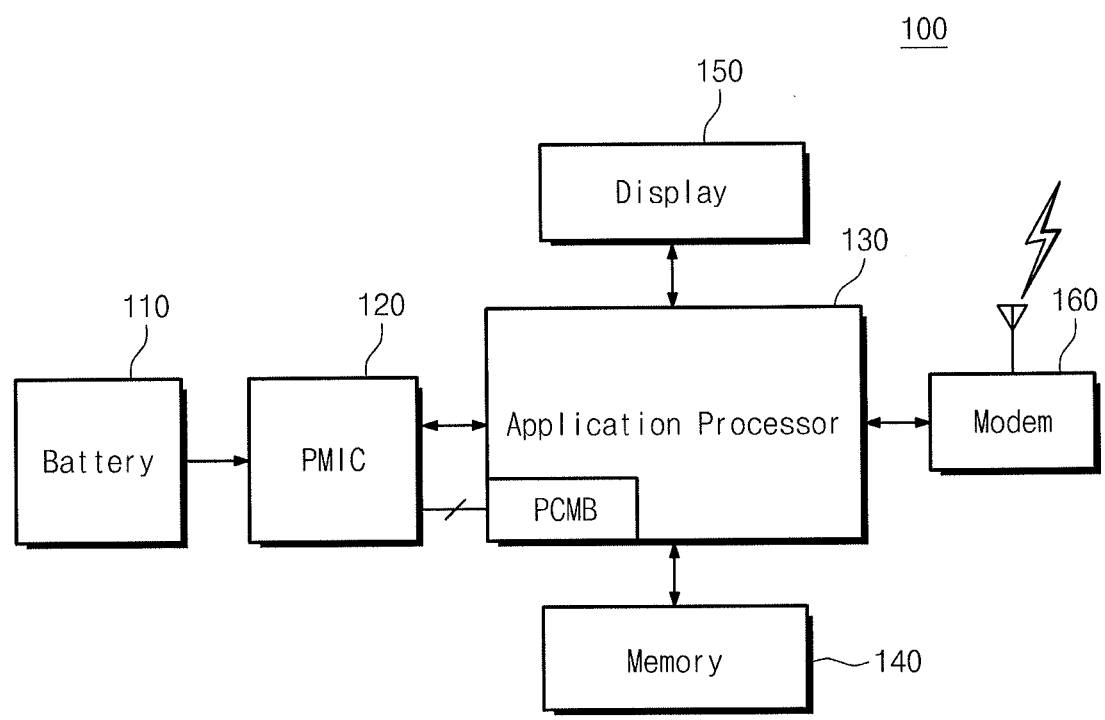
FIG. 7 illustrates a diagram of a mobile terminal according to an embodiment.

FIG. 7 illustrates a diagram of a mobile terminal 100 according to an embodiment. Referring to FIG. 7, the mobile terminal 100 may include a battery 110, a PMIC 120, an application processor 130, a memory 140, a display 150, and a modem chip 160.

The battery 110 may be provided to supply power to the mobile terminal 100. The PMIC 120 may generate various powers necessary for the application processor 130, and supply the generated powers to the application processor 130.

The application processor 130 may execute application programs regarding modules (not shown, for example, camera module and display module) that may be implemented in the mobile terminal 100, and generate media data (image or voice). The application processor 130 may include a Power Consumption Measurement Block (PCMB) 131 for measuring power consumption. Here, the PCMB 131 may have the same configuration and function as those of PCMB 1110 of FIG. 1.

The memory 140 may store a boot code and an application program for booting the application processor 130. The display 150 may output data processed by the application processor 130, or input data to the application processor 130. The modem chip 160 may transmit voice or image data through wireless communication. The modem chip 160 may perform data communication with wireless communication systems through an antenna, and include a modem data processor (not shown) for communication with the wireless communication system.

As described above, an electronic device, e.g., an integrated circuit (IC), etc., and a power consumption measuring method thereof according to an embodiment may deliver desired power consumption information to a user by measuring power consumption of respective power blocks by itself (i.e., without a separate measuring instrument), and storing and processing the measured information. The electronic device and power consumption measuring method may significantly reduce development cost and development time by automatically measuring power consumption, and storing and processing related data, without expensive, high-capacity, and heavy measurement equipment or a jumper unit for measuring the power consumption. The electronic device and a power consumption measuring method thereof may measure various power consumptions according to a plurality of power modes with respect to respective power blocks by selecting power operation mode desired by a user and power blocks to be measured. According to an embodiment, the electronic device according may measure power consumption by itself even upon entrance to sleep mode.

Generally, expensive measuring instruments may be needed to measure power consumption of systems with respect to power management modes and power blocks of processors. Also, jumper units may be needed for physically opening and closing respective power rails on a board to connect the measuring instruments. In addition, where a user monitors the measurement of power consumption by eye, reliability may be reduced, and much time and cost may be required.

In contrast, embodiments described herein may provided an electronic device and a power consumption measuring method thereof, in which a processor measures power consumption of respective power blocks without a separate measuring instrument. The processor may also measure power consumption of the respective power blocks even upon entry into sleep mode. Thus, the processor may maximize efficiency while minimizing cost and time spent in verifying processor power consumption and developing a product.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An electronic device, comprising:
   a power management device, the power management device generating a plurality of powers according to power management information;
   a processor, the processor including a plurality of power blocks supplied with the plurality of powers through a plurality of power lines, and including a power consumption measurement block that measures power consumption of respective power blocks of the plurality of power blocks; and a power measurement active block configured to determine whether power is supplied to the power consumption measurement block.

2. The electronic device as claimed in claim 1, wherein the power management information is provided from the processor to the power management device.

3. The electronic device as claimed in claim 1, wherein the plurality of power lines are directly connected between the power management device and the processor.

4. The electronic device as claimed in claim 1, wherein the power management device supplies power to the power consumption measurement block upon power consumption measurement.

5. The electronic device as claimed in claim 1, wherein the power measurement active block includes:
a first hardware pin supplied with a driving voltage or a ground voltage; and
a second hardware pin supplied with a driving voltage or a ground voltage,
wherein the voltages supplied to the first and second hardware pins determine whether power is supplied to the power consumption measurement block.

6. The electronic device as claimed in claim 1, wherein the power consumption measurement block measures the power consumption of the respective power blocks in concurrence with power supply, and stores measured power consumption information.

7. The electronic device as claimed in claim 6, wherein:
the processor further includes a communication block receiving test data from the outside for power consumption measurement, and outputting the stored power consumption information of the power consumption measurement block to the outside, and
the test data includes power management modes of the processor, information indicating a target power block to be measured, and a voltage level of the target power block.

8. The electronic device as claimed in claim 7, wherein the processor reads a boot code upon power-up, and performs a boot up according to the read boot code.

9. The electronic device as claimed in claim 8, further comprising:
a boot memory storing the boot code; and
a main memory storing programs, wherein:
the programs include a processing program for processing stored power consumption information, and
the processor processes the stored power consumption information according to the processing program, and then outputs the processed power consumption information.

10. The electronic device as claimed in claim 1, wherein the power consumption measurement block calculates power values of each of the power blocks.

11. The electronic device as claimed in claim 1, wherein the power consumption measurement block stores electric current pattern information of each of power blocks, the electric current pattern information corresponding to power values of each of the power blocks.

12. The electronic device as claimed in claim 1, wherein the power consumption measurement block measures and stores the power consumption of each of the power blocks when the processor enters a sleep mode, and the processor outputs the stored power consumption information to the outside upon wake-up of the processor.

13. The electronic device as claimed in claim 1, further comprising
a power switch connected to between the power management device and the power consumption measurement block, the power switch configured to turn on/off according to set value of the power measurement active block.

14. A method of measuring power consumption of an electronic device that includes a power management device generating a plurality of powers according to power management information, includes a processor having a plurality of power blocks supplied with the plurality of powers through a plurality of power lines and having a power consumption measurement block measuring power consumption of each of the plurality of power blocks, and includes a power measurement active block the method comprising:
receiving test data from the outside;
setting the power management device according to the received test data;
determining whether power is supplied to the power consumption measurement block by setting the power measurement active block;
measuring power consumption according to the received test data when the power consumption measurement block is supplied with power;
storing the measured power consumption information; and
outputting the stored power consumption information to the outside.

15. The method as claimed in claim 14, wherein the test data includes power management modes of the processor, information indicating at least one target power block to be measured, and a voltage level corresponding to the at least one target power block.

16. The method as claimed in claim 14, wherein the processor enters a sleep mode, and then outputs the stored power consumption information to the outside after the processor is woken up.

17. An electronic device, comprising:
a boot memory storing a boot code;
a main memory storing a processing program;
a power management device supplied with power through a battery and generating a plurality of powers according to power management information;
a processor having a plurality of power blocks supplied with a plurality of powers from the power management device, and having a power consumption measurement block measuring and storing power consumption of each of the plurality of power blocks, the processor performing a boot up according to the boot code of the boot memory, and processing the stored power consumption information according to the processing program of the main memory; and
a power measurement active block configured to determine whether power is supplied to the power consumption measurement block.

18. The electronic device as claimed in claim 17, wherein the processor includes:
a Central Processing Unit (CPU) core;
a power management device controller controlling the power management device;
an interrupt controller controlling an interrupt of the CPU core; and
a communication block performing a communication with the outside.

19. The electronic device as claimed in claim 17, wherein the power consumption measurement block includes:

an electric current sensor sensing an electric current flowing in each of a plurality of power lines for measurement of the power consumption;

an analog-digital converter converting the measured power value into a digital value; and a measurement information register storing measured power consumption information.

20. An electronic device, comprising:

a processor unit, the processor unit including a processor and having at least two power blocks;

a power supply unit, the power supply unit providing power to the at least two power blocks; and electric current sensors respectively corresponding to the at least two power blocks, each electric current sensor monitoring power consumption of a power block, and a power measurement active block configured to determine whether power is supplied to the electric current sensors, wherein:

the processor can be placed into at least two operation modes, the operation modes including a first operation mode that is a sleep mode and second operation mode that is a normal mode, and the processor is configured to output information regarding the power consumption that is monitored by the electric current sensors in response to a command, the information including information regarding power consumption in the first operation mode and information regarding power consumption in the second operation mode.

* * * * *